United States Patent [19]

Przybyla et al.

[11] 4,112,198
[45] Sep. 5, 1978

[54] METAL-AIR DEPOLARIZED CELL WITH RESTRICTED WATER VAPOR ACCESS

[75] Inventors: Franciszek J. Przybyla; Michael J. Smith, both of Mississauga, Canada

[73] Assignee: P. R. Mallory & Co., Inc., Indianapolis, Ind.

[21] Appl. No.: 837,478

[22] Filed: Sep. 28, 1977

[51] Int. Cl.² ............................................. H01M 8/00
[52] U.S. Cl. ..................................................... 429/27
[58] Field of Search ...................... 429/27, 34, 38, 163, 429/164, 72, 12

[56] References Cited

U.S. PATENT DOCUMENTS

| 3,746,580 | 7/1978 | Aker et al. | 429/27 |
| 3,837,921 | 9/1974 | Henssen | 429/27 |
| 3,840,404 | 10/1974 | Porter et al. | 429/27 |

Primary Examiner—Anthony Skapars
Attorney, Agent, or Firm—Ronald S. Cornell; Israel Nissenbaum; Charles W. Hoffmann

[57] ABSTRACT

A gas-depolarizable galvanic cell in which restricted gas and water vapor access to the gas-depolarizable cathode is provided by interposing a gas and moisture impermeable barrier in the gas communication path and carefully controlling the size of holes or openings in the barrier so as to restrict the gas flow rate past the barrier.

9 Claims, 2 Drawing Figures

METAL-AIR DEPOLARIZED CELL WITH RESTRICTED WATER VAPOR ACCESS

FIELD OF THE INVENTION

This invention relates to gas-depolarizable galvanic cells, and more particularly to gas-depolarizable galvanic cells having alkaline electrolytes and gas communication from the gas-depolarizable cathode of the cell to the exterior of the cell. The present invention provides such a cell, and provides that a gas and moisture impermeable barrier having restricted gas flow past the barrier from one side thereof to the other is interposed in the gas communication path to the gas-depolarizable cathode.

BACKGROUND OF THE INVENTION

There are a number of applications for gas-depolarizable galvanic cells such as zinc-air cells where it is desired to operate the cell and thereby to draw electrical power therefrom only intermittently and at low to medium current flow rates. Typical applications of such operation of gas-depolarizable or metal-air cells may include transistor radios, wall clocks, photographic strobe lights, and the like. In all such circumstances the current flow rate and demand therefor from the cell are quite low when compared, say, to flashlight operation, radio transmitters and the like. In general, it is desirable to restrict the gas flow communication to the gas-depolarizable cathode of the cell, thereby restricting water vapour access to or egress from the cell. Indeed, in some circumstances, it may be desirable to control the limiting current which may be drawn from the cell at its rated terminal voltage.

The major concern, however, is to assure a long operable life for a gas-depolarizable galvanic cell in low rate applications and with intermittent operation, particularly by precluding either moisture loss from the alkaline electrolyte of the cell in low relative humidity ambient conditions, or excessive water vapour absorption by the alkaline electrolyte of the cell at high relative humidity ambient conditions. Obviously, if the alkaline electrolyte is permitted to lose its moisture content and therefore to dry out, the cell may become inoperable. Similarly, if there is too much water vapour influx and absorption by the electrolyte, the physical dimensions of the cell may be altered in that it may be caused to bulge and thereby to leak electrolyte from the cell.

SUMMARY OF THE INVENTION

The present invention provides for the physical interposition of a gas and moisture impermeable barrier in the gas communication path between the gas-depolarizable cathode and the exterior of the cell, where at least one opening is provided in the barrier in such a manner that gas communication past the barrier is at a lower gas flow rate than the otherwise unrestricted gas flow rate which is permissible through the openings provided in the container for the cell. In such circumstances the desired metal-air alkaline electrolyte cell may be provided, using ordinary components which are otherwise used for high rate cells, merely by altering or adding one or more additional manufacturing steps during the assembly of such a cell to obtain the desired low to medium rate cell having restricted gas flow communication to the cathode thereof.

What the present invention provides, therefore, is a means whereby special purpose cells may be provided using ordinary cell components and with the simple addition of a gas and moisture impermeable barrier having a restricted gas flow rate from one side of the barrier to the other. Excessive moisture vapour influx or egress from the cell, respectively, depending upon the relative humidity of the ambient within which the cell is placed, are thereby precluded.

The present invention contemplates that the gas and moisture impermeable barrier which is used, with at least one opening therein to restrict gas flow rate past the barrier, may be one or a combination of a variety of materials including metallic sheeting and foils, metallized plastic membranes, other plastic membranes which are substantially non-porous, and especially heat-shrinkable plastic membranes which may from a jacket over the exterior of a cylindrical cell. However, the present invention is also applicable to other type cells, and in any event the present invention contemplates that the gas and moisture impermeable barrier may be interposed in the gas communication path to the gas-depolarizable cathode of the cell, either within the cell container or at the exterior thereof.

When a gas and moisture impermeable barrier is disposed at the exterior of a cylindrical cell, and at least one opening is provided in the barrier so as to permit gas communication to the gas-depolarizable cathode of the cell at a lower gas flow rate than the otherwise unrestricted gas flow rate permissible through the gas communication openings in the cell container, it has been found that there is sufficient surface roughness on the exterior surface of the cell container to permit gas communication to the gas-depolarizable cathode at the restricted flow rate.

OBJECT OF THE INVENTION

It is an object of this invention to provide a gas-depolarizable galvanic cell having restricted gas and water vapour communication between the external environment and the interior of the cell.

A further object of this invention is to provide a gas-depolarizable galvanic cell with restricted gas and water vapour access or communication to the cathode of the cell, where the cell is intended for low to medium current flow rate applications with intermittent operation, whereby the cell will have an extended operating life.

Yet another object of this invention is to provide a gas-depolariazable galvanic cell having restricted gas and water vapour access to the cathode thereof, which may be manufactured using components intended otherwise for high current rate gas-depolarizable galvanic cells, with the addition of a minimum number of components and/or manufacturing steps.

BRIEF DESCRIPTION OF THE DRAWINGS

These and other objects, purposes and features of the present invention are more fully discussed hereafter, in association with the accompanying drawings in which.

DESCRIPTION OF THE PREFERRED EMBODIMENTS

As stated above, the present invention relates particularly to gas-depolarized galvanic cells of the sort generally referred to as metal-air cells — the most common being zinc-air cells — where the anode may comprise zinc, amalgamated zinc, zinc-cadmium, etc., and where the anode may be gelled or porous such as compressed powder or the like. The invention is applicable to any shape cells, e.g. buttontype cells or cylindrical cells, and provides that a gas and moisture impermeable barrier is interposed in the path of gas communication to the cathode of the cell in such a manner that there is restricted gas communication past the barrier, so as to minimize undesirable water vapour access to or egress from the cell; and as well in certain circumstances, so as to provide current limiting with respect to the cell operation.

It has been found, for example, that a 45% potassium hydroxide alkaline electrolyte establishes a relatively low water vapour pressure inside the cell. If unrestricted gas flow communication is permitted to the cell, and the cell is operating either at very low current rates and/or intermittently, it is possible in high ambient relative humidity conditions for there to be too much water vapour access to the interior of the cell where it is absorbed with the possibility of damage to the cell, such as by causing it to bulge and to leak electrolyte. Likewise, in low relative humidity ambient conditions there may be water vapour egress from the cell, and in such circumstances the dried out cell may become inoperable. In any event, as noted, the present invention minimizes the difficulties referred to above by providing for restricted gas and water vapour access to and from the gas-depolarizable cathode of the cell.

Figure 1:
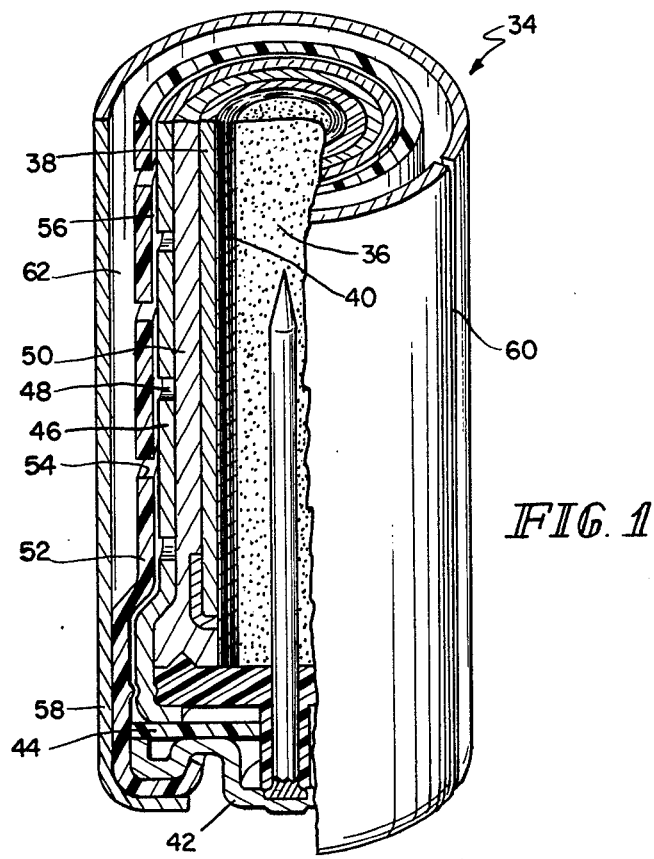
FIG. 1 is a perspective view, partially in cross-section, showing the assembly of a cylindrical cell according to this invention.
Figure 2:
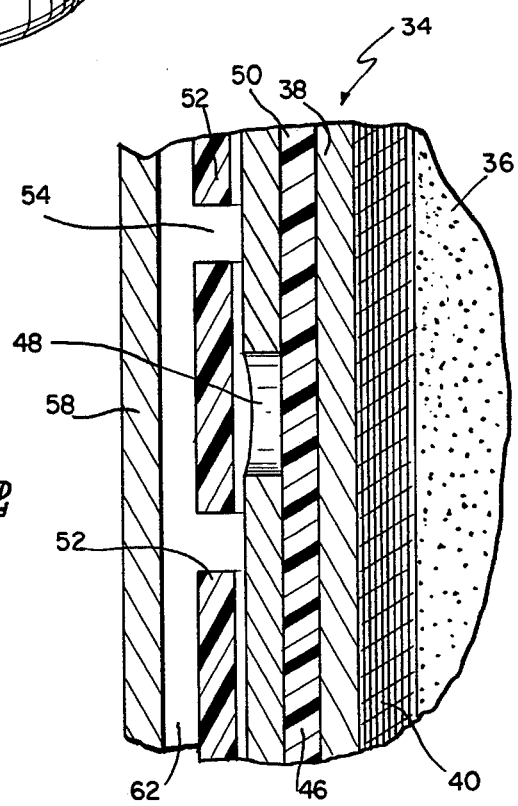
FIG. 2 is an enlarged cross-sectional view, showing a portion of a cylindrical cell as depicted in FIG. 1.

Referring now to FIGS. 1 and 2, portions of a typical cylindrical gas-depolarizable galvanic cell 34 are shown. The cell 34 has an anode 36 and a cathode 38 which may have a generally tubular configuration. A separator 40 is disposed between the anode 36 and the gas-depolarizable cathode 38. A suitable container for the cell is provided, having a negative terminal 42 electrically associated with the anode 36 and insulated by spacer 44 from a cathode container 46 which is electrically associated with the cathode 38, and which has a positive terminal electrically associated therewith. In general, a plurality of openings 58 are formed in the cathode container 46 to permit gas communication from the exterior of the cell 34 to the gas-depolarizable cathode 38. The cell may also include a microporous layer 50 of such material as polytetraflouroethylene and the like, within the cathode container 57 and at the outside of the cathode 38 so as to preclude leakage of liquid electrolyte through the openings 48.

The present invention provides for the interposition of a gas and moisture impermeable barrier in the path of gas communication from the exterior of the cell 34 to the gas-depolarizable cathode 38, and this may be accomplished by the disposition within the cathode container 46 of a gas and moisture impermeable barrier layer between the cathode 38 and the openings 48 in cathode container wall 46. However, in a preferred embodiment for cylindrical cells according to this invention, the gas and moisture impermeable barrier which is interposed in the path of gas communication from the exterior of the cell 34 to the cathode 38 comprises a layer or jacket 52 disposed over the outer surface of the cathode container 46. The barrier 52 may have one or more openings 54 formed therein and the total gas communication from one side of the barrier 52 to the other side thereof is at a lower gas flow rate than the otherwise unrestricted gas flow rate permissible through the openings 48 formed in the cathode container 46. It will be seen that water vapour access to and from the cathode is thereby restricted.

The material of the barrier 52 may be chosen from metal sheeting, metal foil, non-porous plastic membranes, metallized plastic membranes, adhesive-backed tape, and combinations thereof. In particular, the barrier material may be a foil material, such as stainless steel or nickel sheeting, high density polyethylene, high density polypropylene, polyvinyl chloride, polycarbonate, or adhesive-backed tapes where the adhesive is porous or microporous; and when the barrier layer 52 is metallic and conductive, an additional electrical insulating layer is, of course, required as to preclude short-circuiting of the negative terminal 42 to the cathode container 46. For purposes of simplicity of assembly, metallic barrier materials having very fine holes formed therein by rolling, etching, or punching techniques may be used. In the usual case, a heat-shrinkable sleeve or jacket of such material as polyvinyl chloride is used. An annular laminar space 56 is shown between the barrier 52 to the opening 48 in the cathode container 46. This space 56 permits gas communication from the openings 54 in the barrier 52 and the cathode container 46, and generally the space 56 is present as a consequence of the surface roughness of the cathode container 46. The gas passage layer 56 may also comprise the porous or microporous adhesive backing of an adhesive-backed tape where such tape is used as the barrier 52. In any event, it will be seen that from the openings 54 in the barrier 52, the is gas communication along the outer surface of the cathode container 46 to the openings 48 formed therein, and thence through the openings 48, through the microporous PTFE layer 50, if such is present, to the cathode 38.

In commercial embodiments of cylindrical cells according to this invention, the cell further comprises an outer jacket 58 which is usually formed of a heavy metal foil. At least one opening is formed in the outer jacket 58, and in general that opening is a longitudinal slit 60, which may be formed as a consequence of the usual manufacturing step of wrapping the outer jacket around the cell. In so doing, and generally as a practical consequence of the fact that the outer diameter of the cell and its positive and negative terminals at each end thereof is slightly greater than the diameter of the cathode container 46, there is a generally cylindrical air flow passage 62 disposed within the outer jacket 58 and at the outside of the barrier 52. Of course, the dimensions of the slit 60 or other opening in the outer jacket 58 must be such that a gas flow is permitted past the outer jacket 58 to the passage 62 and thence to the openings 54 in the barrier 52 at at least the rate of gas flow which is permitted through the openings 54 in the barrier 52 and into the interior of the cell 34.

A typical size "C" commercial cylindrical cell made in accordance with this invention will have a crimped height approximating 4.2 cm and a diameter of about 2.4 cm. A section of heat-shrinkable plastic sleeve approximately 5.1 cm in length is placed over the outside diameter of the unrestricted cell. After heat shrinking, this layer covers the entire outer wall of the cell subassembly.

For extremely low rate applications, for example a 25 uA Clock Drain, the heat shrink is circumferentially slit in four places at approximately 0.6, 1.8, 2.7, and 3.7 cm, as measured from the crimped top of the cell. For the low rate application, no material is removed from the cuts. In high rate production, it is assumed that the cell assembly would be spun past a series of pre-set blades to form the cuts.

For a higher drain rate application, e.g. a 50 mA Radio Drain, the heat shrinkable material is cut at the same reference points as stated above, but approximately 0.13 cm of material is removed from each slit to increase air access to the air holes.

For both applications, as illustrated, the cell subassembly is finished with a normal crimped metal jacket. In this case, the side slit of 0.025 cm acts as the air entry point to give access to the pre-cut slits.

In a typical size "D" commercial cylindrical cell according to this invention, where the cell is intended for low rate intermittent operation, it is possible to provide for up to 60 mA of current draw from the cell by properly dimensioning the openings 54 in the barrier 52, while still restricting water vapour access to or egress from the cell to an acceptable level. Usually, in such commercial embodiments of the cell, the opening or openings 54 in the barrier 52 are slits which are circumferentially formed around the cathode container 46. As noted, the material of the barrier 52, in such circumstances will advantageously be a heat-shrinkable sleeve of polyvinylchloride or the like. The openings in the gas and moisture impermeable barrier, whether the barrier is external of the cathode container or internal within the cathode container, may be dimensioned so that the permitted current draw at rated voltage from the cell is limited.

There has been described a gas-depolarizable galvanic cell with restricted gas and water vapour access to the cathodes, and likewise with restricted water vapour egress from the cell, where a gas and moisture impermeable barrier is interposed in the path of gas communication from the exterior of the cell to the cathode. At least one opening is formed in the gas and moisture impermeable barrier in such a manner that the gas communication past the barrier through the at least one opening therein is at a lower gas flow rate than the otherwise unrestricted gas flow rate which would be permissible through the opening or openings formed in the cathode container of the cell. The applicability of the invention to cylindrical cells has been discussed, and it has been noted that the gas and moisture impermeable barrier may be internal within the cathode container of the cell or external of the cathode container of the cell. Likewise, a number of different materials have been mentioned as exemplary of the kinds of materials, and combinations thereof, which are suitable for the gas and moisture impermeable barrier, and a variety of ways of forming restricted gas openings in the barrier materials have been suggested. It has been noted that, with the exception of the interposition of the gas and moisture impermeable barrier, and the additional manufacturing steps to form the barrier and/or to place it in the cell, the remaining cell components, including the cathode containers, do not require special handling or working and may be used in common with cell components intended for high rate applications. It has been noted that, because moisture and water vapour access to and egress from the cell is restricted, the usable life of the cell is prolonged, and intermittent operation of the cell at low to medium current drain rates is assured.

Obviously, therefore, the principles of the invention have been exemplified above, without restriction, and those principles, materials and assemblies may otherwise be employed or disposed without departing from the spirit and scope of the accompanying claims.

What is claimed is:

1. In a gas-depolarizable galvanic cell having an anode, a gas-depolarizable cathode, an electrolyte carrying separator therebetween, and a container for said cell having negative and positive terminals electrically insulated from each other and electrically associated with said anode and cathode, respectively, and wherein there is at least one opening in said container for gas communication from the exterior of the cell to said gas-depolarizable cathode, the improvement comprising a gas and moisture impermeable barrier interposed in the path of said gas communication to said cathode, said barrier having at least one opening therein and being interposed in said gas communication path in such a manner that the gas communication past said barrier is at a lower gas flow rate than the otherwise unrestricted gas flow rate permissible through said at least one opening in said container.

2. The combination of claim 1 wherein said barrier is chosen from the group consisting of metal sheeting, metal foil, non-porous plastic membranes, metallized plastic membranes, and adhesive-backed tapes, and combinations thereof.

3. The combination of claim 1 wherein said barrier is chosen from the group consisting of stainless steel sheeting, stainless steel foil, aluminum foil, high density polyethylene, high density polypropylene, polyvinyl chloride, and combinations thereof.

4. The combination of claim 1 wherein said barrier is a heat shrunk plastic material.

5. The combination of claim 1 wherein said cell has a cylindrical configuration with a cathode container having a plurality of openings therein, said gas-depolarizable cathode has a generally tubular configuration and is disposed within said cathode container; and wherein said barrier is disposed within said cathode container adjacent to said cathode on the side thereof between the cathode and the cathode container.

6. The combination of claim 1 wherein said cell has a cylindrical configuration with a cathode container having a plurality of openings therein, said gas-depolarizable cathode has a generally tubular configuration and is disposed within said cathode container; and wheresaid barrier is disposed over the outer surface of said cathode container.

7. The combination of claim 6 where said barrier is a heat-shrunk plastic jacket having at least one slit therein.

8. The combination of claim 7 where said jacket is slit circumferentially around said cathode container.

9. The combination of claim 8 and further comprising an outer jacket for said cell with at least one opening therein to allow gas flow past said outer jacket at least at the rate of gas flow permitted past said barrier.

* * * * *